(12) United States Patent
Toyooka et al.

(10) Patent No.: US 9,494,817 B2
(45) Date of Patent: Nov. 15, 2016

(54) DISPLAY WITH NONWOVEN DIFFUSER

(71) Applicant: 3M INNOVATIVE PROPERTIES COMPANY, St. Paul, MN (US)

(72) Inventors: Kazuhiko Toyooka, Yamagata Prefecture (JP); Hiroki Matsuda, Yamagata Prefecture (JP); Masaki Yamamuro, Tokyo (JP); James A. Thielen, Hugo, MN (US); Jayant Chakravarty, Woodbury, MN (US); Eric W. Nelson, Stillwater, MN (US); John A. Wheatley, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 115 days.

(21) Appl. No.: 14/374,975

(22) PCT Filed: Jan. 29, 2013

(86) PCT No.: PCT/US2013/023574
§ 371 (c)(1),
(2) Date: Jul. 28, 2014

(87) PCT Pub. No.: WO2013/116193
PCT Pub. Date: Aug. 8, 2013

(65) Prior Publication Data
US 2015/0022757 A1    Jan. 22, 2015

Related U.S. Application Data

(60) Provisional application No. 61/592,954, filed on Jan. 31, 2012.

(51) Int. Cl.
*G02F 1/1335* (2006.01)
*B32B 5/02* (2006.01)

(52) U.S. Cl.
CPC ....... *G02F 1/133504* (2013.01); *G02F 1/1336* (2013.01); *G02F 1/133606* (2013.01); *B32B 5/022* (2013.01); *B32B 2457/20* (2013.01)

(58) Field of Classification Search
CPC .... G02B 5/3008; G02B 5/0242; G02B 5/02; G02B 5/0236; G02B 5/305; G02B 6/001; G02B 6/0053; G02B 6/0051; G02B 6/04; G02B 6/0055; G02B 6/02347; G02B 6/02352; G02B 6/02357; G02B 6/02361; G02B 6/02371; G02B 6/0008; G02B 6/0031; G02B 6/00; G02B 6/0006; G02B 6/06; G02B 2027/0123; G02B 1/04; G02F 1/133602; G02F 1/133606; G02F 1/133615; G02F 1/133611; G02F 1/133504; G02F 1/133524; G02F 2001/133607; G02F 2001/133507
USPC ......... 359/599, 290, 487.06; 349/64, 65, 61; 362/97.1, 97.2, 355, 615, 618, 97.4
See application file for complete search history.

(56) References Cited

U.S. PATENT DOCUMENTS

2003/0123150 A1    7/2003    Brickey
2006/0292954 A1    12/2006    Suzuka
(Continued)

FOREIGN PATENT DOCUMENTS

| CN | 1121622 | 9/2003 |
|---|---|---|
| CN | 100355562 | 12/2007 |
| JP | 8-94810 | 4/1996 |
| JP | 8-320406 | 12/1996 |
| JP | 8-327804 | 12/1996 |
| JP | 9-304602 | 11/1997 |

(Continued)

OTHER PUBLICATIONS

International Search Report for PCT International Application No. PCT/US2013/023574, mailed on Apr. 11, 2013, 3 pages.

*Primary Examiner* — Thoi Duong
(74) *Attorney, Agent, or Firm* — Lisa P. Fulton

(57) ABSTRACT

The present disclosure describes a display system including a liquid crystal display panel and a light source emitting light capable of emitting light. A nonwoven diffuser element is disposed between the light source and the liquid crystal display panel. The polymeric nonwoven diffuser is non-orientated and has a fiber diameter of less than 50 micrometers, a fiber aspect ratio of length/diameter of greater than 5 and a basis weight in a range from 10 to 80 grams/meter$^2$.

10 Claims, 2 Drawing Sheets

(56) References Cited

U.S. PATENT DOCUMENTS

| | | |
|---|---|---|
| 2007/0153384 A1 | 7/2007 | Ouderkirk |
| 2008/0080055 A1 | 4/2008 | Lightfoot |
| 2010/0272980 A1* | 10/2010 | Kowata .................. C08B 11/02 428/220 |

FOREIGN PATENT DOCUMENTS

| | | | |
|---|---|---|---|
| JP | 2004-151707 | 5/2004 | |
| JP | 2006-316253 | * 11/2006 | ........... G02F 1/1333 |
| KR | WO 2010/126188 | * 11/2010 | ............... G02B 5/02 |
| WO | 2007/079204 | 7/2007 | |

* cited by examiner

DISPLAY WITH NONWOVEN DIFFUSER

FIELD

The present disclosure relates to, among other things, displays with nonwoven diffusers.

BACKGROUND

Liquid crystal displays (LCDs) are optical displays used in devices such as laptop computers, hand-held calculators, digital watches and televisions. Some LCDs include a light source that is located on the side of the display, with a light guide positioned to guide the light from the light source to the back of the LCD panel. Other LCDs, for example some LCD monitors and LCD televisions (LCD-TVs), are directly illuminated using a number of light sources positioned behind the LCD panel. This arrangement is increasingly common with larger displays, because the light power requirements, to achieve a certain level of display brightness, increase with the square of the display size, whereas the available real estate for locating light sources along the side of the display only increases linearly with display size. In addition, some LCD applications, such as LCD-TVs, require that the display be bright enough to be viewed from a greater distance than other applications, and the viewing angle requirements for LCD-TVs are generally different from those for LCD monitors and hand-held devices.

Some LCD monitors and LCD-TVs are commonly illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is used to smooth the illumination profile at the back of the LCD device.

Many LCD-TV diffuser plates employ a polymeric matrix of polymethyl methacrylate (PMMA) with a variety of dispersed phases that include glass, polystyrene beads, and $CaCO_3$ particles. These plates often deform or warp after exposure to the elevated temperatures of the lamps. In addition, some diffusion plates are provided with a diffusion characteristic that varies spatially across its width, in an attempt to make the illumination profile at the back of the LCD panel more uniform. Such non-uniform diffusers are sometimes referred to as printed pattern diffusers. They are expensive to manufacture, and increase manufacturing costs, since the diffusing pattern must be registered to the illumination source at the time of assembly. In addition, the diffusion plates require customized extrusion compounding to distribute the diffusing particles uniformly throughout the polymer matrix, which further increases costs.

BRIEF SUMMARY

The present disclosure relates to displays with nonwoven diffusers, among other aspects.

In many embodiments, a display system is described. The display system includes a liquid crystal display panel and a light source emitting light capable of emitting light. A nonwoven diffuser element is disposed between the light source and the liquid crystal display panel. The polymeric nonwoven diffuser is non-orientated and has a fiber diameter of less than 50 micrometers, a fiber aspect ratio of length/diameter of greater than 5 and a basis weight in a range from 10 to 80 grams/meter$^2$.

In many embodiments, the display system includes a liquid crystal display panel and a light source emitting light capable of emitting light. A polymeric nonwoven diffuser element is disposed between the light source and the liquid crystal display panel. The polymeric nonwoven diffuser is non-orientated and has having a visible light transmission of 50% or greater and an effective transmission of 0.9 or greater.

BRIEF DESCRIPTION OF THE DRAWINGS

The disclosure may be more completely understood in consideration of the following detailed description of various embodiments of the disclosure in connection with the accompanying drawings, in which.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The present disclosure describes displays with nonwoven diffusers, among other aspects. In particular, the present disclosure relates to displays with nonwoven diffusers where the nonwoven diffuser has high transmittance, high haze, low clarity and provides uniform light emission. The nonwoven diffuser has brightness enhancement capability and image hiding of light sources such as CCFLs and LEDs in the backlight of LCD systems, for example. While the present disclosure is not so limited, an appreciation of various aspects of the disclosure will be gained through a discussion of the examples provided below.

Figure 1:
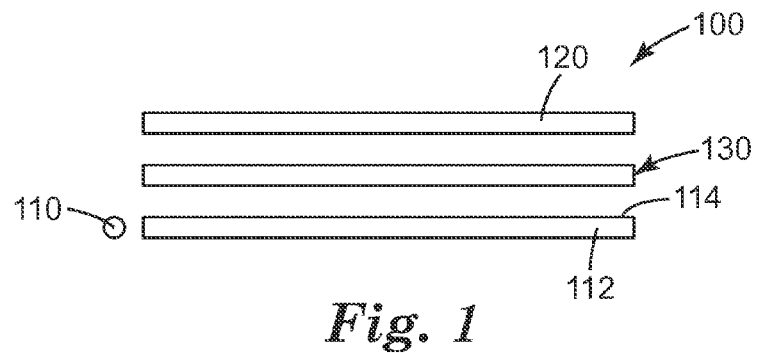
FIG. 1 is a schematic diagram of an illustrative display system.

FIG. 1 is a schematic diagram of an illustrative display system 100. The display system 100 includes a liquid crystal display panel 120 and a light source 110 capable of emitting light. While an edge lit display system 100 is illustrated, it is understood that the system can be a direct lit or back lit display system, or combination of a direct lit or backlit display.

The illustrated display system 100 includes a light source 110 emitting light into a light guiding plate 112 and the light guiding plate 112 emitting light through a light emission surface 114. A nonwoven diffuser element 130 is disposed between the light emission surface 114 and the liquid crystal display panel 120. While an edge lit display system 100 is illustrated, it is understood that the system can be a direct lit or back lit display system.

Figure 2:
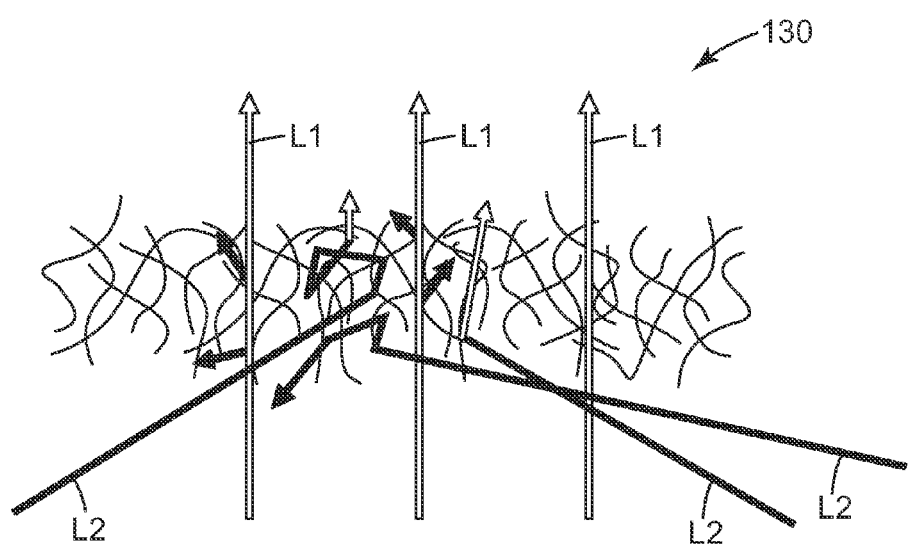
FIG. 2 is a schematic diagram side-view of an illustrative diffuser.

FIG. 2 is a schematic diagram side-view of an illustrative diffuser 130. Normal angle light L1 passes through the nonwoven diffuser element 130 with relative ease. High angle light L2 is scattered or diffused by the fibers of the nonwoven diffuser element 130 and a portion of this light L2 is emitted at a relative normal angle. Thus, the nonwoven diffuser element 130 can improve the on-axis brightness of the light emitted thought the nonwoven diffuser element 130.

The nonwoven diffuser element 130 can be formed by any useful process. Nonwoven diffuser elements 130 can be formed via a wet laid process, a carding process, a meltblown process, spunbond, dry laid, spunbond-meltblown-spunbond, for example. The nonwoven diffuser element 130 can be embossed or calendared, as desired. The nonwoven diffuser element 130 can be described as being generally non-orientated. In some embodiments the manufacturing process may produce a slight orientation, however this would still be considered as generally non-orientated.

The nonwoven diffuser element 130 can be formed of multiple layers of nonwoven elements. The nonwoven diffuser element 130 can be suspended in the display system by being affixed at two or more edges of the nonwoven diffuser element 130. In some embodiments the nonwoven diffuser element 130 is affixed to a supporting substrate or optical element within the display system.

When the nonwoven diffuser 130 is placed on an optical cavity such as a backlight, for example, it can operate as a brightness enhancement film. Light rays incident from close to normal angle, perpendicular to the optical cavity surface and nonwoven diffuser 130, travel through the nonwoven fiber structure without much diffusion or scattering. Light rays from larger inclination angles (high angles), likely hit the nonwoven fibers of the structure and are diffused and/or scattered. Viewing the polymeric nonwoven diffuser at normal angles, the polymeric nonwoven diffuser looks transparent and viewing the polymeric nonwoven diffuser at high angles, the polymeric nonwoven diffuser looks opaque and/or hazy. Thus, the volume of the light rays appear to collimate to normal angle due to the above phenomena.

In many embodiments, the polymeric nonwoven diffuser 130 has a fiber diameter of less than 50 micrometers, a fiber aspect ratio of length/diameter of greater than 5 and a basis weight in a range from 10 to 80 grams/meter$^2$. In some embodiments the polymeric nonwoven diffuser 130 has a fiber diameter of less than 25 micrometers or is in a range from 1 to 25 micrometers or in a range from 10 to 25 micrometers. In some embodiments the polymeric nonwoven diffuser 130 has a basis weight in a range from 20 to 70 grams/meter$^2$. In some embodiments, the polymeric nonwoven diffuser element 130 has a density of 0.1 g/cc or greater, or 0.15 g/cc or greater, or a density of 0.2 g/cc or greater.

The polymeric nonwoven diffuser 130 is non-orientated and can exhibit high haze, high transmittance, low clarity and provides uniform light emission. In many embodiments, the polymeric nonwoven diffuser element 130 has a visible light transmission of 50% or greater, or 60% or greater, or 65% or greater, or 70% or greater. The polymeric nonwoven diffuser element 130 has an effective transmission of 0.9 or greater, or 1.0 or greater. The polymeric nonwoven diffuser element 130 has a haze of 80% or greater, or 85% or greater, or 90% or greater, or 95% or greater. The polymeric nonwoven diffuser element 130 has a clarity of 70% or less, or 60% or less, or 50% or less.

The nonwoven diffuser 130 can be formed of any useful polymeric material. In many embodiments the polymeric nonwoven diffuser 130 can be formed of polyethylene, polypropylene, and polyethylene terephthalate, or engineering plastics such as polybutylene terephthalate, and polyphenylene sulfide, for example. In some embodiments the nonwoven diffuser 130 can be formed of glass fibers.

In some embodiments a resin material at least partially fills the nonwoven diffuser 130. The resin can be any useful resin material. In some embodiments the resin is a curable (e.g., U.V. curable) resin material.

Some of the advantages of the disclosed systems and constructions are further illustrated by the following example. The particular materials, amounts and dimensions recited in this example, as well as other conditions and details, should not be construed to unduly limit the present disclosure.

EXAMPLES

A display system (see FIG. 1, 100) was constructed using an E2041T liquid crystal display (LCD) 120 from LG Corporation (Youngdungpo-gu Seoul, Korea). The display was modified by removing the incumbent films and replacing them with only a bead coated diffuser or non-woven diffuser 130. The gain diffuser was the incumbent gain diffuser in the display from LG Corporation and the non-woven diffusers 130 tested were: Freudenberg Nonwovens 2431 (Weinheim, Germany), Asahi Kasei Corporation A5130 (Tokyo, Japan), Crane & Co., Inc. RS 8.5 (Dalton, Mass.), Midwest Filtration Company Uniblend 100 (Cincinnati, Ohio), Freudenber Nonwoves 2483 (Weinheim, Germany) and Kolon Finon C303 (Gwacheon, Korea). It is believed that the fiber aspect ratio of length/diameter of greater than 5 for all samples listed herein. The samples tested had the functional and structural qualities shown in FIG. 1. Results of various testing is reported below in TABLE 1.

TABLE 1

NONWOVEN FUNCTIONAL AND STRUCTURAL PROPERTIES

| | Freudenberg 2431 | Asahi Chemical A5130 | Crane RS 8.5 | Uniblend 100 | Kolon Finon C303 | Freudenberg 2483 |
|---|---|---|---|---|---|---|
| Fiber Diameter (micron) | 21.7 | Spunbond: 12.8 Meltblown: 2.5 | 7.6 | Polyester: 13.8 Cellulose: 20.2 | 20.3 | 14.6 |
| Fiber Aspect Ratio (length/diameter) | Supplier Proprietary | Supplier Proprietary | Supplier Proprietary | Supplier Proprietary | Supplier Proprietary | Supplier Proprietary |
| Basis weight (gsm) | 60 | 20 | 32 | 30 | 30 | 70 |
| Density (g/cc) | 0.32 | 0.2 | 0.74 | 0.148 | 0.236 | 0.75 |
| Effective Transmission | 1.042 | 1.038 | 1.022 | 1.053 | 1.053 | 0.918 |
| Transmission | 81.1% | 75.1% | 75.2% | 76.5% | 82.2% | 54% |
| Haze | 96.9% | 96.2% | 97.6% | 84.7% | 77.9% | 100% |
| Clarity | 66.3% | 46.8% | 53.3% | 78.6% | 80.2% | 24.4% |

Figure 3:
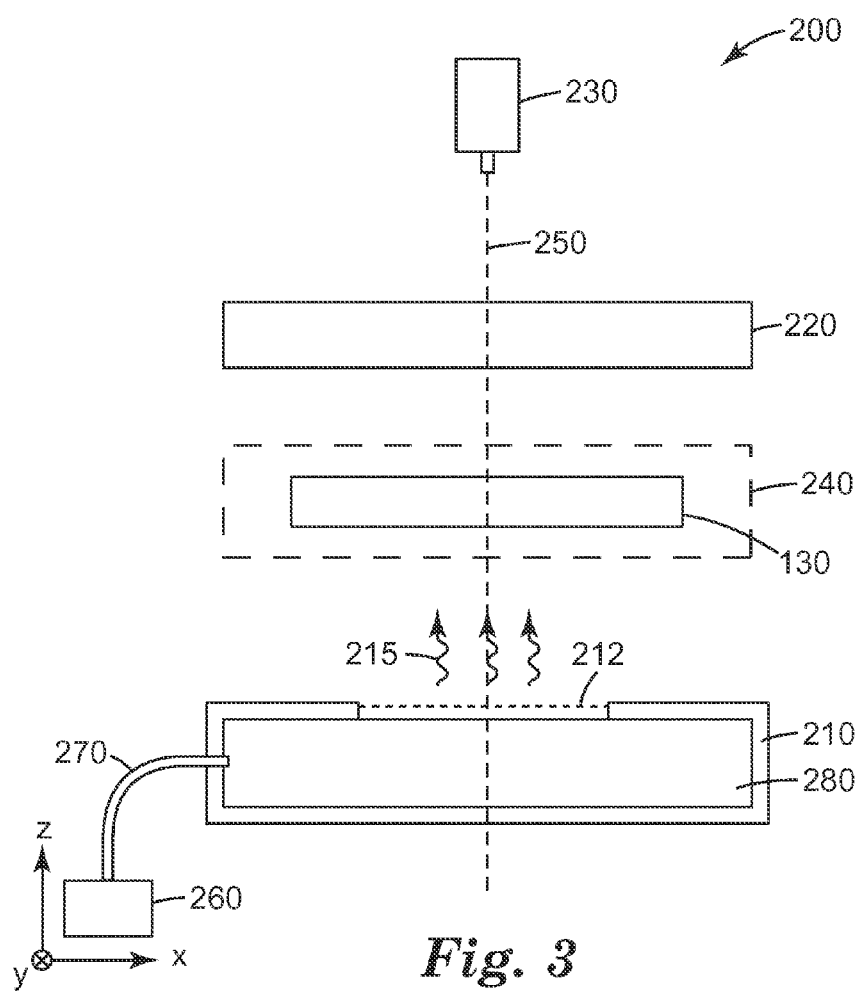
FIG. 3 is a schematic diagram of an illustrative system to measure effective transmission.

Effective transmission was measured using an effective transmission measurement system that is described by the following:

Effective transmission is the ratio of the luminance of the display system with the film in place in the display system to the luminance of the display without the film in place. Effective transmission (ET) can be measured using optical system illustrated in FIG. 3. Optical system 200 is centered on an optical axis 250 and includes a hollow lambertian light box that emits a lambertian light 215 through an emitting or exit surface 212, a linear light absorbing polarizer 220, and a photo detector 230. Light box 210 is illuminated by a stabilized broadband light source 260 that is connected to an interior 280 of the light box via an optical fiber 270. A test sample, the ET of which is to be measured by the optical system, is placed at location 240 between the light box and the absorbing linear polarizer.

The ET of nonwoven diffusing film 130 can be measured by placing the nonwoven diffusing film 130 in location 240. Next, the spectrally weighted axial luminance $I_1$ (luminance along optical axis 250) is measured through the linear absorbing polarizer by the photo detector. Next, the nonwoven diffusing film 130 is removed and the spectrally weighted luminance $I_2$ is measured without the nonwoven diffusing film 130 placed at location 240. ET is the ratio $I_1/I_2$.

Optical haze, as used herein, is defined as the ratio of the transmitted light that deviates from the normal direction by more than 4 degrees to the total transmitted light. Haze values disclosed herein were measured using a Haze-Gard Plus haze meter (available from BYK-Gardiner, Silver Springs, Md.) according to the procedure described in ASTM D1003.

Optical clarity, as used herein, refers to the (absolute value) ratio $1-(T_1-T_2)/(T_1+T_2)$, where $T_1$ is the transmitted light that deviates from the normal direction between 1.6 and 2 degrees from the normal direction, and $T_2$ is the transmitted light that lies between zero and 0.7 degrees from the normal direction. Clarity values disclosed herein were measured using a Haze-Gard Plus haze meter from BYK-Gardiner.

Optical transmission (i.e., total transmittance), as used herein, is the ratio of the luminance flux transmitted through a surface to the flux incident on that surface (expressed as a percentage). Practically speaking, it is the number reported by the Haze-Gard Plus system, which follows the D1003 ASTM standard.

The LG LCD's low-voltage differential signal (LVDS) connector was disconnected to create a white screen when the display was powered on. Finally, a Radiant Imaging ProMetric camera from Pro-Lite Technology Ltd (Northampton, United Kingdom) was used with a 50 mm lens from Sigma Corporation (Kanagwa, Japan) to take brightness measurements.

The measurement taken was the average brightness of a cross section of the display in the center that measured 161 mm across. The result of each non-woven was then divided by the brightness measured for the gain diffuser to get a relative brightness. The uniformity was judged by eye against the incumbent gain diffuser and rated on a scale of one to three with three representing the gain diffuser uniformity level, two representing an adequate uniformity and one representing an unacceptable uniformity. The results are an average of four different observers and are summarized in TABLE 2 along with the brightness.

TABLE 2

| | Freudenberg 2431 | Asahi Chemical A5130 | Crane RS 8.5 | Uniblend 100 | Kolon Finon C303 | Freudenberg 2483 |
|---|---|---|---|---|---|---|
| Brightness | 102% | 102% | 103% | 103% | 100% | 104% |
| Uniformity | 1.9 | 1.1 | 2.3 | 1.1 | 1.1 | 2 |

For an edge type system shown in FIG. 1, the Freudenberg 2431, Freudenberg 2483 and Crane RS 8.5 are the samples tested to show both adequate gain and uniformity. In previous experiments, the A5130 has shown to exhibit adequate uniformity and brightness in a direct lit system.

Nonwoven Density Example Set

A display system was constructed as described above. Non-woven diffusers tested were created with a carded process at 32 feet per minute with a 1 m wide double doffer Hergeth-Hollingsworth (Dulmen, Germany) carding machine into a web batting of 40 gsm and then conveyed to a hot air conveyor belt oven (IHEI Inc., Franklin, Wis.) at 32 fpm and 140 degrees centigrade to stabilize the web. The fiber used in these nonwovens are 2 denier (about 14 micrometer diameter) polyester bi-component filaments commercially available from Stein Inc., Albany, N.Y. (Style 131-00251). Subsequently the web passed at 5 feet per minute through flat calendar rolls at 125 degrees centigrade at various clearances to achieve different densities as described in TABLE 3 below.

TABLE 3

|  | Sample 1 | Sample 2 | Sample 3 | Sample 4 |
| --- | --- | --- | --- | --- |
| Fiber Diameter (micron) | 14 | 14 | 14 | 14 |
| Fiber Aspect Ratio (length/diameter) | 3600 | 3600 | 3600 | 3600 |
| Basis weight (gsm) | 40 | 40 | 40 | 40 |
| Density (g/cc) | 0.025 | 0.2 | 0.52 | 0.8 |
| Effective Transmission | 1.052 | 1.041 | 1.031 | 1.027 |
| Transmission | 82.9 | 83.1 | 84.1 | 83 |
| Haze | 76.6 | 80.7 | 82.4 | 97.8 |
| Clarity | 79.7 | 77.3 | 77.9 | 52.7 |

The fiber diameter was measured using Hirox Digital microscope model number KH7700 (Hackensack, N.J.). Effective transmission, transmission, haze, clarity, brightness and uniformity were measured using the method described above.

The results are an average of four different observers and are summarized in TABLE 4 along with the brightness.

TABLE 4

|  | Sample 1 | Sample 2 | Sample 3 | Sample 4 |
| --- | --- | --- | --- | --- |
| Brightness | 102% | 103% | 101% | 99% |
| Uniformity | 1.1 | 1.4 | 1.4 | 2.1 |

Thus sample 4 (0.8 g/cc) is an adequate sample with respect to brightness and uniformity.

Resin Filled Nonwoven Examples

A5100 nonwoven samples from Asahi Kasei (Tokyo, Japan) were used as precursor materials. A5100 is a spun-bond-meltblown-spunbond 20 gsm nonwoven composite where the meltblown layer has fiber diameters in a range from 2-3 micrometers. The samples were then modified according to the following procedure:

A UV-curable acrylate adhesive resin (UVX-1962 from Toagosei,Tokyo, Japan) was applied to PET film using a wire bar coating method (with wire bar gauges either 5 or 12). For samples 3, 4 and 5 where the PET film was removed after curing, the PET film had a silicone layer to facilitate removal. An uncoated PET film was used for sample 2. Sample 1 was not coated with resin and served as a control.

The A5100 nonwoven material was pressed against the PET film with the UVX-1962 resin coating. For sample 5, the UVX-1962 was applied to the A5100 a second time in order to bury the nonwoven fibers.

The samples were then placed in a UV oven to cure the UVX-1962 resin.

After curing the resin, the PET was removed from samples 3, 4 and 5, leaving only the resin-coated nonwoven.

The performance of the samples was measured. Results are reported in TABLE 5 below.

TABLE 5

| ID | Substrate | NWM Top | Wire bar gauge | Haze | Transmission | Effective transmission |
| --- | --- | --- | --- | --- | --- | --- |
| 1 |  | Control |  | 87.13 | 79.68 | 1.054 |
| 2 | PET | exposed | 5 | 93.38 | 84.58 | 1.103 |
| 3 | none |  |  | 73.85 | 90.71 | 1.069 |
| 4 |  |  | 12 | 78.93 | 88.85 | 1.055 |
| 5 |  | buried |  | 93.46 | 82.23 | 1.039 |

The effective transmission was measured as described in previous examples.

The total transmission and haze levels were measured using a ND-2000 Haze meter (available from Nippon Denshoku Industries Company, Tokyo, Japan) according to the JIS K7361-1: 1997 and JIS K7136:2000 test standards. The light source used was a standard D65 type.

Thus, embodiments of DISPLAY WITH NONWOVEN DIFFUSER are disclosed. One skilled in the art will appreciate that the optical films and film articles described herein can be practiced with embodiments other than those disclosed. The disclosed embodiments are presented for purposes of illustration and not limitation.

What is claimed is:

1. A display system, comprising:
a liquid crystal display panel;
a light source emitting light capable of emitting light; and
a polymeric nonwoven diffuser element optically between the light source and the liquid crystal display panel, the polymeric nonwoven diffuser being non-orientated and having a fiber diameter of less than 50 micrometers, a fiber aspect ratio of length/diameter of greater than 5 and a basis weight in a range from 10 to 80 grams/meter$^2$: wherein the polymeric nonwoven diffuser element comprises a resin filling at least a portion of the nonwoven diffuser element and has a haze of 90% or greater and a visible light transmission of 70% or greater.

2. A display system according to claim 1 wherein the display system is a direct lit display system.

3. A display system according to claim 1 wherein the display system is an edge lit display system.

4. A display system according to claim 1 wherein the polymeric nonwoven diffuser element has a density of 0.15 g/cc or greater.

5. A display system according to claim 1 wherein the polymeric nonwoven diffuser element has an effective transmission of 0.9 or greater.

6. A display system according to claim 1 wherein the polymeric nonwoven diffuser element has a clarity of 70% or less.

7. A display system according to claim 1 wherein the polymeric nonwoven diffuser element has a fiber diameter of less than 50 micrometers.

8. A display system according to claim 1 wherein the polymeric nonwoven diffuser element has a fiber aspect ratio of length/diameter of greater than 5.

9. A display system according to claim 1 wherein the polymeric nonwoven diffuser element has a basis weight in a range from 10 to 80 grams/meter$^2$.

10. A display system according to claim 1 wherein the polymeric nonwoven diffuser element has an effective transmission of 1.0 or greater.

* * * * *